(12) United States Patent
Lin et al.

(10) Patent No.: US 8,775,105 B2
(45) Date of Patent: Jul. 8, 2014

(54) ONBOARD ADAPTIVE BATTERY CORE TEMPERATURE ESTIMATION

(75) Inventors: Jian Lin, Beverly Hills, MI (US); Rezina S. Nabi, Troy, MI (US); Gary M. Insana, New Baltimore, MI (US); Mahendra M. Kenkre, Troy, MI (US); Wenbo Wang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 504 days.

(21) Appl. No.: 12/914,245

(22) Filed: Oct. 28, 2010

(65) Prior Publication Data

US 2012/0109554 A1 May 3, 2012

(51) Int. Cl.
*G01R 31/36* (2006.01)
*H02J 7/00* (2006.01)
*H01M 10/0525* (2010.01)
*H01M 10/48* (2006.01)

(52) U.S. Cl.
CPC ............ *H01M 10/486* (2013.01); *Y02E 60/122* (2013.01); *Y02T 10/7011* (2013.01); *H01M 10/0525* (2013.01)
USPC .......................................... 702/63; 320/137

(58) Field of Classification Search
USPC ..................... 702/63; 320/150, 137
See application file for complete search history.

(56) References Cited

U.S. PATENT DOCUMENTS

| | | | | |
|---|---|---|---|---|
| 6,076,964 | A * | 6/2000 | Wu et al. ....................... | 374/141 |
| 2004/0128086 | A1* | 7/2004 | Barsoukov et al. ............. | 702/63 |
| 2007/0139017 | A1* | 6/2007 | Marchand et al. ............ | 320/150 |
| 2009/0055110 | A1 | 2/2009 | Kelley et al. | |
| 2009/0091299 | A1 | 4/2009 | Lin et al. | |
| 2012/0013189 | A1* | 1/2012 | Jenkins .......................... | 307/80 |

FOREIGN PATENT DOCUMENTS

WO 2007/073452 A1 6/2007

OTHER PUBLICATIONS

Ollie Jay, Michel B. DuCharme, Paul Webb, Francis D. Reardon, Glen P. Kenny; "Estimating changes in volume-weighted mean body temperature using thermometry with an individualized correction factor"; May 26, 2010; (http://ajpregu.physiology.org/content/early/2010/05/26/ajpregu.00546.2009.full.pdf+html); pp. 1-36.*

Hande, Internal Battery Temperature Estimation Using Series Battery Resistance Measurements During Cold Temperatures, ScienceDirect, Journal of Power Sources (www.elsevier.com/locate/jpowsour), Nov. 27, 2005, 8 pages.

* cited by examiner

*Primary Examiner* — John Breene
*Assistant Examiner* — Manuel Rivera Vargas
(74) *Attorney, Agent, or Firm* — Dinsmore & Shohl LLP

(57) ABSTRACT

Methods and systems for dynamically estimating the core temperature of at least one cell in a battery. In one aspect, the method includes using a combination of estimations including one based on ohmic resistance and another based on a function of thermal energy transfer through the battery. A weighting factor may be used for each of the estimations as a way to calculating a core temperature. The estimation based on ohmic resistance may be made determined independently of a measured surface temperature of the battery or any of the cells in the battery.

18 Claims, 3 Drawing Sheets

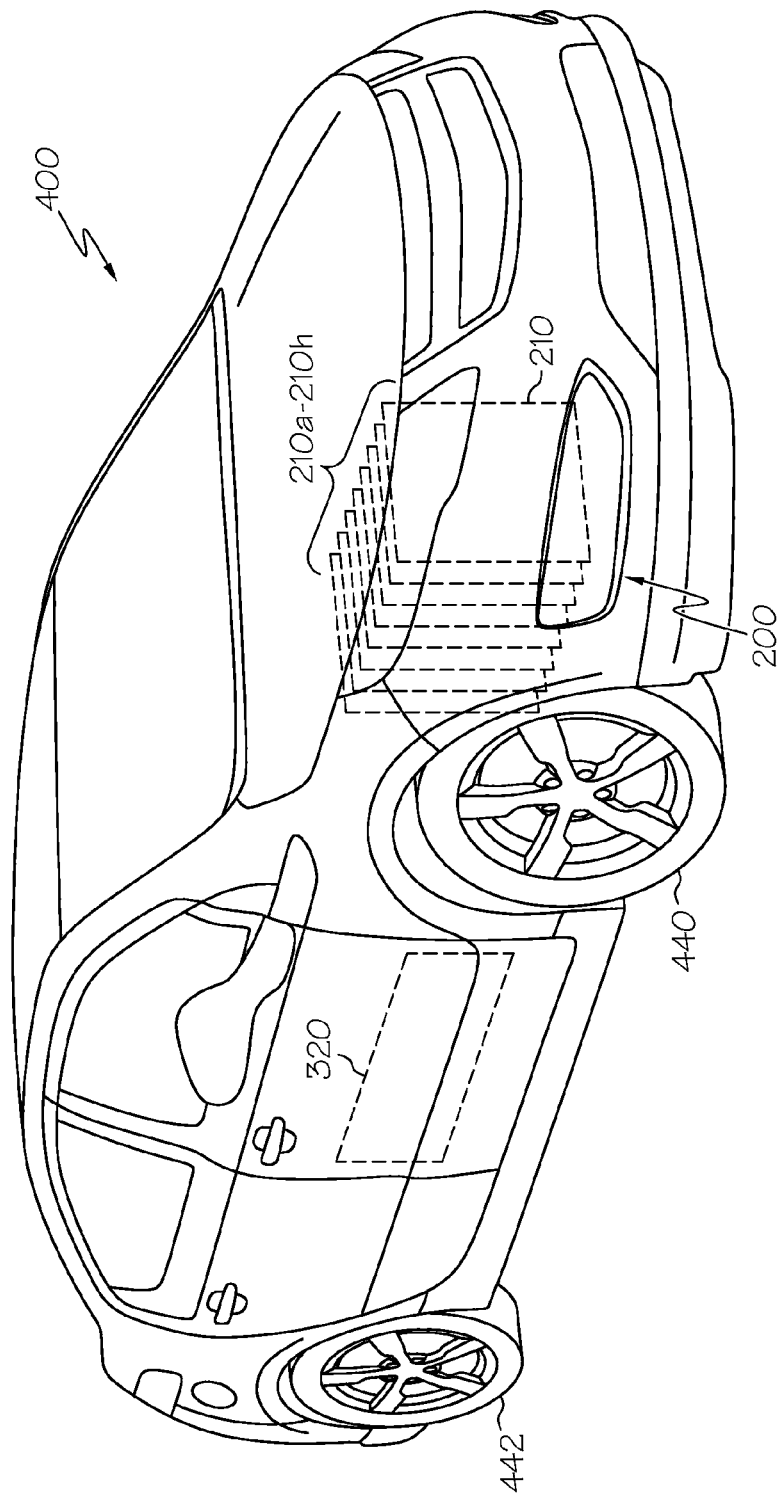

ONBOARD ADAPTIVE BATTERY CORE TEMPERATURE ESTIMATION

The present invention relates generally to batteries used for hybrid or electric vehicles, and relates particularly to methods and systems for estimating the core temperature of at least one cell in a battery.

BACKGROUND

The increasing demand to improve vehicular fuel economy and reduce vehicular emissions has led to the development of both hybrid vehicles and pure electric vehicles. Pure electric vehicles may be powered by a battery pack (which is made up of numerous smaller modules or cells), while hybrid vehicles include two or more energy sources, such as a gasoline (also referred to as an internal combustion) engine used as either a backup to or in cooperation with a battery pack. There are two broad versions of hybrid vehicles currently in use. In a first version (known as a charge-depleting hybrid architecture), the battery can be charged off a conventional electrical grid such as a 120 VAC or 240 VAC power line. In a second version (known as a charge-sustaining hybrid architecture), the battery receives all of its electrical charging from one or both of the internal combustion engine and regenerative braking. In either configuration, various parameters associated with the battery pack can be monitored to ensure proper operation.

One such parameter that is useful in monitoring the proper operation of a battery pack (or battery) is the temperature of a cell in the battery pack. One method of determining the temperature of a cell in a battery pack is to put a sensor in the core of the cell; this method has proven to be expensive and unreliable. Another method involves directly measuring the temperature of the surface of the cell with a sensor. However, the temperature of the surface of a cell in a battery pack is often different from the temperature of the core of a cell in a battery pack, in some instances as large as 30° C. These and other problems make it difficult to accurately and reliably estimate the core temperature of a battery pack.

SUMMARY

According to one embodiment of the present invention, a method for determining the core temperature of a battery that is made up of numerous cells includes performing a first estimation of the core temperature wherein the first estimation is independent of the surface temperature of the battery, performing a second estimation of the core temperature as a function of thermal energy transfer through the battery, applying a weighting factor to each of the first and second estimations and then calculating an estimated core temperature as a function of the weighted first and second estimations. In the present context, the term "independent of the surface temperature" refers to determining the core temperature based upon parameters associated with the battery that need not include a measurement of the surface temperature of the battery or the various cells within the battery. Likewise, the first and second estimations correspond to fast and slow estimations, where the former is used for calculations that respond to changes in the core temperature of the battery without delay such that the dynamic estimation accurately reflects the present temperature of the core. Similarly, the slow estimation is used to refer to determining the core temperature of the battery based upon parameters associated with the battery which respond to changes in the core temperature of the battery with delay, which typically occurs with calculations based on thermal conduction.

Optionally, the weighting factor is determined as a function of ambient temperature variation and air flow rate. In another option, the first estimation is found by measuring terminal current and terminal voltage of one or more cells in the battery, determining an ohmic resistance ($R_{ohm}$) and a state of charge (SOC) of the cell based on the measured terminal current and the measured terminal voltage via recursive formula and then determining the first estimation based on the $R_{ohm}$ and SOC. Preferably, the $R_{ohm}$ and SOC used in the first and second estimations come from the same recursive formula.

In another option, the first estimation, $R_{ohm}$ and SOC are related to one another in a lookup table. The lookup table may be updated. Examples of situations where updating the lookup table may be appropriate include taking into consideration the effect of battery aging on $R_{ohm}$ and taking into consideration significant climactic or environmental changes, as $R_{ohm}$ is dependent upon temperature. For example, a given open circuit voltage (which can be determined based on, among other things, the measured voltage, current and resistance) can be correlated to a SOC within the lookup table. Furthermore, within a preferred battery operating range (such as a SOC between roughly 10% and 90%), the SOC estimate is substantially temperature-independent (especially in a predicted operating range of the battery between −20° C. and +50° C.); as such, the variation of SOC within the operating voltage is relatively small (for example, less than 2%), enabling a simple determination of SOC from the lookup table that correlates temperature, open circuit voltage and SOC. For the purposes of describing and defining the present invention, the terms "about" and "substantially" are utilized herein to represent the inherent degree of uncertainty that may be attributed to any quantitative comparison, value, measurement, or other representation. As such, these terms are also utilized herein to represent the degree by which a quantitative representation may vary from a stated reference without resulting in a change in the basic function of the subject matter at issue. In one form, updating the lookup table includes measuring the surface temperature of the battery upon termination of a stable rest period, comparing the measured surface temperature to the calculated core temperature and replacing the calculated core temperature with the measured surface temperature if the measured surface temperature differs from the calculated core temperature by more than a temperature difference threshold.

In yet another option, the first estimation is repeated over a time interval. Such time interval may be based on the particular needs of the system. In another option, the second estimation can be achieved by measuring the terminal current of one or more of the battery's cells, obtaining $R_{ohm}$ with a recursive formula, measuring a surface temperature and determining the second estimation based on the measured terminal current, the obtained $R_{ohm}$ and the measured surface temperature. In the present context, measurement of the surface temperature will be understood to correspond to the battery or the cells or other portion of the battery that correspond to the temperature value needed to perform the desired estimation. The relevant temperature measurement of the battery or a portion thereof will be accordingly understood to be the one that satisfies this estimation.

Still another option includes characterizing the second estimation by a relationship between the measured terminal current, the obtained Rohm, at least one of a thermal conduction coefficient and a convection coefficient and at least two of a core temperature of the at least one cell, a surface temperature of the least one cell and an ambient temperature. The second estimation may optionally be characterized by a thermal capacity constant that corresponds to a change in core temperature over time. Calculating the core temperature as a function of the weighted first and second estimations may optionally be performed in accordance with a linear relationship between the calculated core temperature ($T_{core}$), the weighting factor (w) and first and second estimations ($T_1$) and ($T_2$). Recitations herein of "at least one" component, element or the like should not be used to create an inference that the alternative use of the articles "a" or "an" should be limited to the singular.

According to another embodiment of the present invention, a method for dynamically estimating the core temperature of a battery includes performing a first estimation of the core temperature based on $R_{ohm}$ and SOC values in a lookup table and performing a second estimation of the core temperature based on thermal energy transfer through the battery such that the second estimation forms a main predictor of the dynamic estimation and the first estimation forms a corrector of the second estimation. In such a configuration, the second estimation (which is based on heat transfer through the battery) responds relatively slowly, while the first estimation can provide quick-response corrections. In the present context, a dynamic process is one that permits updates based on external events. Thus, real-time and recursive formula calculations, as well as feedback-based updates may be utilized to achieve such dynamic behavior. As such, the terms "dynamic" and "dynamically" are used herein to refer to the variable or changing estimation of the core temperature. For example, the core temperature of the cells in a battery is dynamically estimated such that the core temperature is determined in real-time without delay. Such estimation may be updated at periodic time intervals, examples of which may include ranging from about 0.01 second to about 10 seconds, from about 0.1 second to about 1 second, or other such suitable time intervals.

Optionally, the method additionally includes measuring a surface temperature of the battery such that factors used to perform the second estimation are selected from the group consisting of terminal current, $R_{ohm}$, a thermal capacity of the battery, a thermal resistance of the battery and the measured surface temperature of the battery. The method may further include measuring the surface temperature and an ambient temperature such that factors used to perform the second estimation are selected from the group consisting of a thermal resistance of the battery, a convection coefficient, the measured surface temperature and the ambient temperature. The convection coefficient can vary depending on whether a supplemental source of forced airflow is present. For example, if a fan (such as those used to provide convective cooling to an automotive radiator in a conventional ICE) is used, the airflow may be considered to be forced, which will provide a different level of convection coefficient than in situations where only natural convection is present. In either event, the convection coefficients are a function of temperature data available in a lookup table, where the convection coefficient that corresponds to forced convention is additionally a function of forced convection airflow that is also available in a lookup table or related device. In the present context, the natural convection coefficient may alternatively be referred to as a first convection condition, while the forced convection coefficient may alternatively be referred to as a second convection condition. The lookup table may be configured in a manner generally similar to the lookup table discussed above in conjunction with the first embodiment. As with the first embodiment discussed above, the method may also include weighting the first and second estimations to arrive at the dynamic estimation of the present embodiment.

More particularly, the core temperature is determined in accordance with a linear relationship between weighted values of the first and second estimations. In another option, the method further comprises updating the determined core temperature by repeating the various acquired and calculated data over time. Recitations herein of a component being "configured" in a particular way, "configured" to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

In yet another embodiment, a system for dynamically estimating the core temperature of at least one cell in a vehicular battery pack as a function of thermal energy transfer is disclosed. The system includes numerous sensors which transmit information related to one or more of the surface temperature of the cell and the ambient temperature, the terminal voltage of the cell and the terminal current of the cell. The system additionally includes a controller (also referred to as a control system) in signal communication with the sensors. In the present context, the controller may comprise any number of hardware, software, firmware or related components configured to perform the specified functions. As such, the controller may employ various integrated circuit components, including memory elements, digital signal processing elements, logic elements, lookup tables or the like in order to carry out a variety of functions under the control of a microprocessor or related devices. Furthermore, any number of data transmission protocols known to those skilled in the art may be used to establish interconnectivity between the various parts of the controller, as well as between the controller and the sensors described herein. In a preferred form, the controller can be configured as a digital device, such as a rudimentary digital computer. As will be appreciated by those skilled in the art, such a computer system may include an input, an output, the aforementioned microprocessor (also referred to as a processing unit, central processing unit (CPU) or the like) and memory that can temporarily or permanently store such a code, program or algorithm such that the instructions contained in the code are operated upon by the processing unit based on input data in order to have output data that is generated by the code and the processing unit be conveyed to another program or a user via output. In one form, a data-containing portion of the memory (also called working memory) is referred to as random access memory (RAM), while an instruction-containing portion of the memory (also called permanent memory or read only memory (ROM). A data bus or related set of wires and associated circuitry forms a suitable data communication path that can interconnect the input, output, CPU and memory, as well as any peripheral equipment in such a way as to permit the system to operate as an integrated whole. In this way, such a computer system exhibits von Neumann architecture characteristics. In the context of the present invention, the devices making up the controller and its ancillary equipment cooperate to provide instructions for the dynamic estimation of the core temperature of at least one cell in the battery as discussed herein. The instructions are written to measure the terminal current of the at least one cell, obtain the $R_{ohm}$ of the at least one cell, wherein the $R_{ohm}$ is determined via recursive formula, measure the surface temperature of the at least one cell, and determine the core temperature of the at least one cell based on the measured terminal current, the obtained $R_{ohm}$ and the measured surface temperature. Portions of the system may be configured as an article of manufacture, where the article include a computer usable medium having computer readable program code embodied therein for executing the various measuring, acquiring, calculating, determining and related functions associated with the present invention.

Optionally, the instructions that are configured to correct the dynamic estimation through a temperature estimation that is independent of the surface temperature of the battery include program code to: measure the terminal current of the at least one cell; measure the terminal voltage of the at least one cell; determine the $R_{ohm}$ and SOC of the at least one cell based on the measured terminal current and the measured terminal voltage with a recursive formula; and determine core temperature based on the determined $R_{ohm}$ and SOC. The instructions further comprise program code to apply a weighting factor to take into consideration the amount of correction to be added to the estimated core temperature that is a function of thermal energy by the estimated core temperature that is independent of the surface temperature. In another option, the system is incorporated into a vehicle.

These and other features and advantages of these and other various embodiments according to the present invention will become more apparent in view of the drawings, detailed description, and claims provided that follow hereafter.

BRIEF DESCRIPTION OF THE DRAWINGS

The embodiments set forth in the drawings are illustrative and exemplary in nature and not intended to limit the subject matter defined by the claims. The following detailed description of the embodiments of the present invention can be best understood when read in conjunction with the following drawings, where like structure is indicated with like reference numerals, and in which:

FIG. 1A depicts a vehicle employing a system for dynamically estimating battery core temperature in accordance with at least one embodiment of the present invention;

DETAILED DESCRIPTION

Figure 1B:
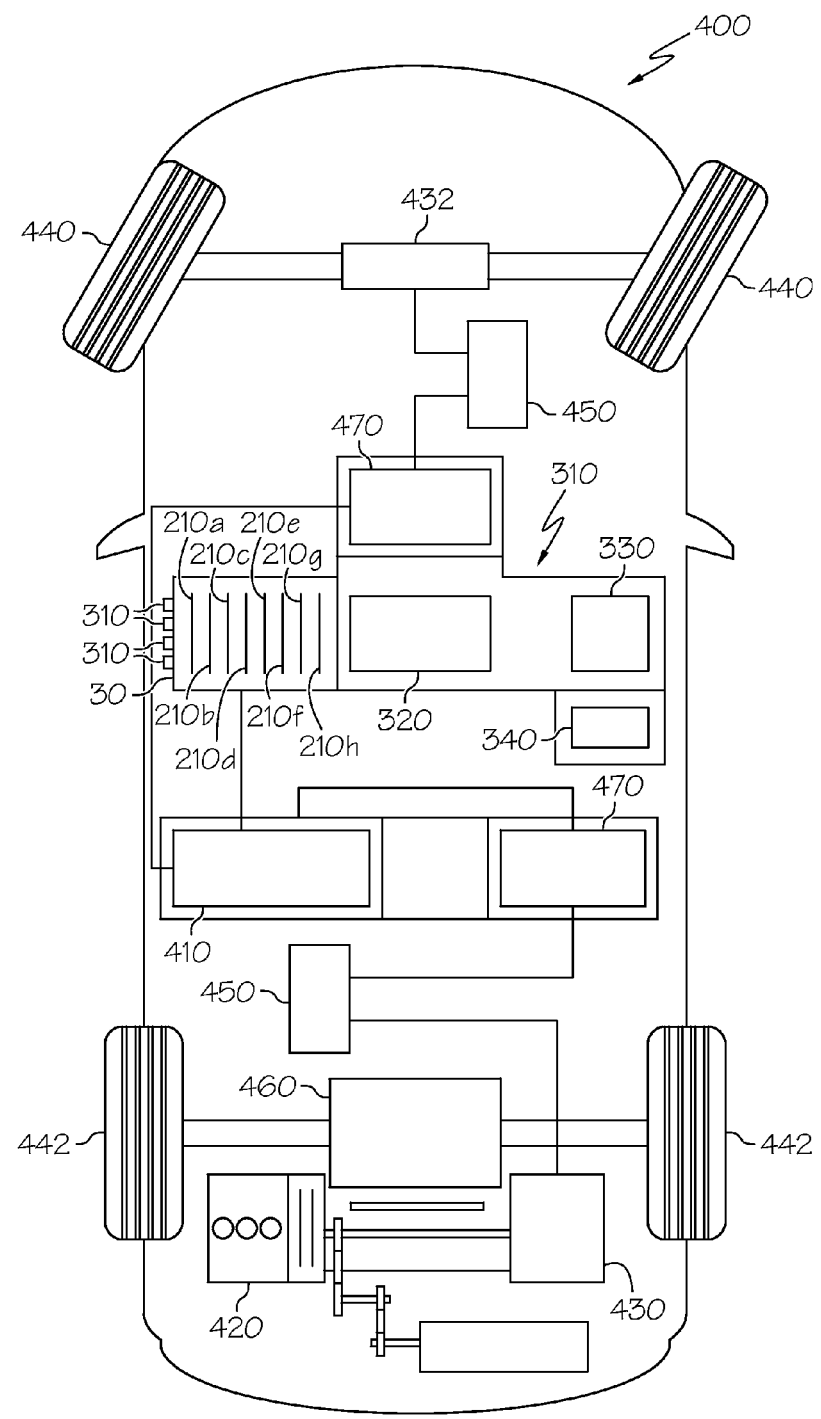
FIG. 1B depicts a platform of the vehicle of FIG. 1A with a diagrammatic representation of various components that provide motive power and dynamic core temperature estimation thereto.

Referring first to FIGS. 1A and 1B, a vehicle 400 that receives at least a portion of its motive power from an energy storage system (ESS) 200 with a battery pack, or more simply battery, 210 making up at least a portion of ESS 200 is shown. Front and rear wheel sets 440 and 442 are coupled to a drivetrain such that they are rotatably responsive to motive power generated by battery 210. In one aspect, the vehicle 400 is a hybrid vehicle, an electric vehicle or an electric hybrid vehicle. In an alternative aspect, the system 300 for dynamically estimating the core temperature of the cells 210a-210h is provided in devices other than a vehicle 400, wherein the device derives at least a portion of its power from the battery 210. It is understood by one of ordinary skill in the art that the vehicle 400 may comprise, in addition to a battery 210, a hybrid system controller 410, an internal combustion engine 420, a plurality of motion generating means 430, 432, a plurality of DC converters 450, a differential 460, and a plurality of power inverter modules 470. The vehicle 400 may further comprise additional components not discussed herein which would be useful in combination with a hybrid vehicle, an electric vehicle or an electric hybrid vehicle It will be understood by those skilled in the art that vehicle 400 may be ICE-powered such that vehicle 400 receives other non-propulsive forms of power from battery 210.

Numerous individual cells 210a-210h make up battery 210. While the present invention is discussed in conjunction with batteries 210 made from lithium-ion, it will be understood by one of ordinary skill in the art that the method of the present invention may be performed with batteries 210 of any type. In one aspect, a fan (such as an electrically-driven fan, not shown) may be used to provide convective cooling of the batteries 210. The battery 210, as well as the cells 210a-210h comprise a surface and a core. It is understood by one of ordinary skill in the art that the method for dynamically estimating the core temperature may be performed with the battery 210 and cells 210a-210h of any shape, size, and connectivity. For example, the shape of the cells 210a-210h may comprise a substantially cylindrical shape, a substantially prismatic shape or the like. Additionally, the connectivity of the cells 210a-210h may comprise parallel circuitry or series circuitry.

The terminal voltage and current of the cells 210a-210h is measured with at least one sensor 310 that is part of system 300. The sensor 310 may comprise any suitable device for measuring current, such as an ammeter, a clamp meter, a galvanometer and combinations thereof. Likewise, the terminal voltage may be measured with at least one voltmeter, potentiometer or oscilloscope, and combinations thereof. Furthermore, the sensors 310 may include a temperature-measuring device, such as a thermistor, thermometer or related device. A control system (also called a controller) 320 coordinates activities of the battery 210, as well as that of sensed, measured, acquired and manipulated data that is used in conjunction with the present invention. The controller 320 is in signal communication with the sensors 310 such that a signal conveying information is transmitted and/or received. The signal may be transmitted through conductive medium, airborne, optical signals via optical waveguides or the like.

The controller 320 comprises a memory device 340 and a processor 330 in signal communication with one another, along with instructions for dynamically estimating the core temperature of the cells 210a-210h in the battery 210. The processor 330 may comprise an integrated circuit, a microchip, a computer, an application-specific integrated circuit (ASIC) or a field programmable gate array (FPGA). Furthermore, the memory device 340 may comprise RAM, DRAM, SDRAM, ROM, a flash memory, a static memory or other modes of mass data storage. In one particular aspect, the memory device 340 and the controller 330 are discrete components; however, it is understood by one skilled in the art that the memory device 340 and the controller 330 may also form an integral unit. The instructions are written to measure the terminal current of the cells 210a-210h, obtain the $R_{ohm}$ of the at least one cell 210a-210h, wherein $R_{ohm}$ is determined via recursive formula. The instructions are further written to measure the surface temperature of the cells 210a-210h (and also to measure an ambient temperature surrounding the battery 210), and to determine the core temperature of the cells 210a-210h based on the measured terminal current, the obtained $R_{ohm}$ and the measured surface temperature.

The controller 320 may be in signal communication with other systems of the vehicle 400 such that it may convey information related to the dynamically estimated core temperature to the systems, which allows such systems to operate the vehicle 400 to maximize performance, efficiency, longevity, and other optimizable parameters. More particularly, conveying information related to the estimated core temperature to various systems in the vehicle 400 may offer the following advantages, including, but not limited to: (1) improving battery availability to improve fuel economy and performance in vehicle 400; (2) enhancing power capability estimation; (3) preventing stall conditions in vehicle 400; (4) increasing availability of auto stop/start function in vehicle 400; (5) improving warranties as transition to various battery wearout failure modes is closely linked to the core temperature as opposed to the surface temperature; (6) requiring no additional hardware; (7) employing one or more lookup tables 60; and (8) providing a fast response.

Figure 2:
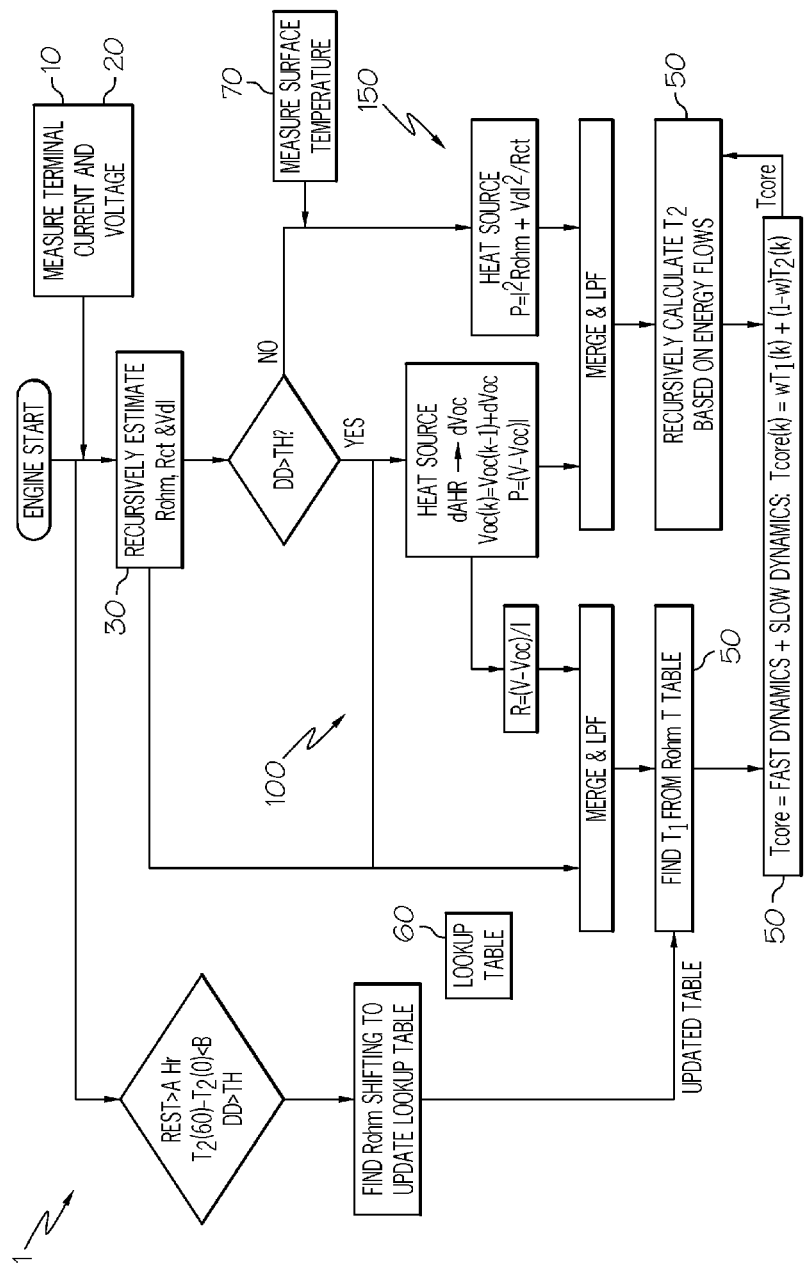
FIG. 2 is a flow chart depicting the dynamic estimation of the core temperature of an embodiment of the present invention including both an estimation based on measurements and calculations that do not require foreknowledge of the surface temperature of the battery and an estimation based on thermal energy transfer through the battery.

Referring next to FIG. 2, a flowchart depicting steps taken in performing method 1 for dynamically estimating the core temperature of one or more of the cells 210a-210h in a battery 210. Method 1 includes two separate estimation paths or subroutines, including the aforementioned first estimation 100 and second estimation 150. As will be apparent form the discussion below, some of the steps (and the resulting data or parameters obtained thereby) are common to both the first and second estimations 100, 150. Method 1 includes measuring the terminal current 10 of at least one of the cells, measuring the terminal voltage 20 of at least one of the cells, determining the $R_{ohm}$ 30 of at least one of the cells 210a-210h based on the measured terminal current and the measured terminal voltage via recursive formula, determining the SOC 40 of at least one of the cells based on the measured terminal current and the measured terminal voltage via recursive formula, and determining the core temperature 50 of the battery 210 or cells 210a-210h based on the determined $R_{ohm}$ 30 and the determined SOC 40. The core temperature of the cells 210a-210h or battery 210 is determined based on the determined $R_{ohm}$ 30 and the determined SOC 40 via lookup table 60. In a further aspect, the lookup table (or tables) 60, which may be stored on memory device 340, comprises values that correspond to one or more of these parameters. These measurements can serve as the basis for the fast and slow estimations, where the first (i.e., fast) estimation may be used to correct or otherwise be coupled to the second (i.e., slow) estimation. The lookup table 60 may be either a singular table, or numerous tables such that in this latter configuration, one or more tables will be dedicated to data and parameters associated with one or the other of the two estimation subroutines. The SOC 40 of the method 1 is based on the measured terminal current 10 and the measured terminal voltage 20 via recursive formula. In one particular aspect, the recursive formula is based on a battery equivalent circuit model. In one particular aspect, the $R_{ohm}$ 30 and the SOC 40 are determined as described in commonly-owned U.S. application Ser. No. 11/876,497, filed Oct. 4, 2007, the contents of which are fully incorporated by reference herein.

As stated above, the lookup table 60 or tables can be updated. In one particular aspect, updating the lookup table 60 comprises measuring the surface temperature 70 of at least one of the cells 210a-210h at the termination of a stable rest period, comparing 80 the measured surface temperature to the determined core temperature, and replacing 90 the determined core temperature with the measured surface temperature wherein the measured surface temperature differs significantly from the determined core temperature. Generally, the surface temperature and the core temperature are not comparable. However, after a stable rest period, the surface temperature and the core temperature are comparable; as a result, the surface temperature can be used as the initial value of the core temperature after a stable rest period. The term "stable rest period" is used herein to refer to a period of time required for the surface temperature of the cells and the estimated core temperature of the cells to converge once an event (such as cessation of operation of the battery) occurs. During the stable rest period, the cells in a battery are neither charging nor discharging. In the context of a vehicle, in one particular aspect, the stable rest period refers to a period of time wherein the vehicle is turned off such that the cells in the battery are neither charging nor discharging. Likewise, in the context of the stable rest period, the term "initiation" is used herein to refer to the time at which the stable rest period begins. In the context of a vehicle, initiation refers to the time at which the key is turned to the off position such that controller ceases to initiate charging or discharging the cells of the battery, or "key-off." Similarly, in the context of the stable rest period, the term "termination" is used herein to refer to the time at which the stable rest period ends. In the context of a vehicle, termination refers to the time at which the key is turned from the off position to a position wherein the controller initiates charging or discharging the cells of the battery, or "key-on." For example, the key may be turned from the off position to the on position or to any of the accessory positions.

In another aspect, updating the lookup table 60 comprises comparing the measured surface temperature 80 to the determined core temperature 90. In this particular aspect, the core temperature of the cells 210a-210h is determined at the termination of the stable rest period. In yet another aspect, updating the lookup table 60 comprises replacing the determined core temperature 90 with the measured surface temperature 70 when there is significant difference among the two. After a stable rest period, the surface temperature equals the core temperature. In the present context, a temperature difference may be considered to be significant when such difference is beyond a predetermined threshold. Likewise, such differences may be tied into a particular temperature range. For example, the surface temperature differs significantly from the determined core temperature in the range of about 0° C. to about 50° C.

In this particular aspect, the method 1 for dynamically estimating the core temperature independent of the surface temperature is adaptive such that the lookup table 60 may be updated to account for parameters associated with the battery 210 which vary with age. For example, in one particular aspect, the method 1 is adaptive in that the lookup table 60 may be updated to account for a changing $R_{ohm}$ 30 value associated with battery 210 aging. Because the $R_{ohm}$ 30 of cells 210a-210h in battery 210 may increase with age, the lookup table 60 that can be used to extract the core temperature from a known SOC 40 and $R_{ohm}$ 30 can be periodically updated to reflect these changes. In one aspect, $R_{ohm}$ 30 of cells 210a-210h in a battery 210 increases over a long period of time, including years. In such circumstances, updating the lookup table 60 may be performed over a significantly shorter period, such as weekly, monthly or quarterly. In situations wherein the climate changes frequently, the lookup table 60 may be updated more often. In such circumstances, the lookup table 60 is updated at every termination of the rest period. In another example, the method 1 for dynamically estimating the core temperature may include updating the determined core temperature by repeating over time the measuring of terminal current 10, terminal voltage 20 and determining $R_{ohm}$ 30, SOC 40 and the core temperature 50. The variation of SOC 40 with open circuit voltage over various temperatures (for example, between −20° C. and +50° C. that may be typical of a battery-powered automotive application) may form the basis for an appropriate lookup table similar to lookup table 60.

The steps of method 1 for dynamically estimating the core temperature that is independent of the surface temperature may be performed in any order. For example, measuring the terminal current 10 and terminal voltage 20 may be performed in any order, including substantially simultaneously such that $R_{ohm}$ 30 and SOC 40 may be determined.

Second estimation 150 making up method 1 is for dynamically estimating the core temperature of the cells 210a-210h in battery 210 as a function of thermal energy transfer through the cells 210a-210h of battery 210, where thermal energy is generated from internal ohmic resistance. The primary mode of heat exchange is by conduction, and at least some of the thermal energy is transferred from the surface of the cells 210a-210h to the ambient atmosphere. The second estimation 150 comprises measuring the terminal current 10 of the cells 210a-210h in a manner generally similar to that of the first estimation 100. This measurement is used to obtain $R_{ohm}$ 30 that, as stated above, is determined via recursive formula that is based on the measured terminal current 10 and the measured terminal voltage 20 as described in commonly-owned U.S. application Ser. No. 11/867,497, filed Oct. 4, 2007, the contents of which are fully incorporated by reference herein. As such, $R_{ohm}$ 30 is determined independent of the surface temperature as discussed and exemplified above. In one form, $R_{ohm}$ 30 is stored on a memory device 340. Additional steps include measuring the surface temperature 70 of the cells 210a-210h, and determining the core temperature 50 based on the measured terminal current 10, the obtained $R_{ohm}$ 30 and the measured surface temperature 70. Unlike the first estimation 100, the second estimation 150 involves the use of measured surface temperature, and therefore cannot be said to be independent of such surface temperature.

In one particular aspect of the second estimation 150, the core temperature is determined in accordance with the following relationship:

$$I^2 R = C_{th}\frac{dT_{core}}{dt} + K(T_{core} - T_{skin}) \tag{1}$$

wherein I is the terminal current 10, R is $R_{ohm}$ 30, $C_{th}$ is a thermal capacity constant, $T_{core}$ is the core temperature 50, K is a thermal conduction coefficient, and $T_{skin}$ is the measured surface temperature 70 of the relevant portion of battery 210. Thermal capacity constant $C_{th}$ is determined in accordance with the physical properties (including, for example, the density or related properties) of the cells 210a-210h that make up battery 210, while thermal conduction coefficient K is a property of the materials of the same. As a result, K may change as a function of temperature; such function can be easily integrated into lookup table 60. In situations where measurement of the surface temperature is available, equation (1) provides a superior solution to the estimated core temperature of the second estimation.

In another aspect of the second estimation 150, the core temperature is determined in accordance with the following relationships:

$$I^2 R = C_{th}\frac{dT_{core}}{dt} + H(T_{skin} - T_{amb}) \tag{2}$$

$$K(T_{core} - T_{skin}) = H(T_{skin} - T_{amb}) \tag{3}$$

where the ambient temperature $T_{amb}$ is measured and used as a component in such determination, while I, R, $C_{th}$, $T_{core}$, $T_{skin}$ and K are as described above in conjunction with equation (1). Ambient temperature $T_{amb}$ as represented by equations (2) to (3) is preferably a measured quantity. Additionally, H is a convection coefficient that is a function of the temperature of at least one of the cells 210a-210h in battery 210 and the degree of forced air movement adjacent the battery 210. In situations where cooling fans are either not present or not in operation, H is a function only of the temperature cell or battery temperature and can be determined off line via lookup table 60 similar to that described and exemplified above. In situations where some means (such as an electric fan or the like) of providing forced air is operable, corresponding values of H can be determined. As before, a lookup table 60 with core temperature versus $R_{ohm}$ 30 and SOC 40 to help estimate the core temperature. The accuracy of equations (1)-(3) is limited by the forced air flow rate (i.e. the fan speed) and the variation rate of the ambient temperature (regarding equations (2) and (3)).

In the method 1, the second estimation 150 is determined core temperature as a function of thermal energy transfer in at least one of the cells 210a-210h while the first estimation 100 that is based on $R_{ohm}$ 30 and SOC 40 and further are adjusted in accordance with the following relationship:

$$T_{core} = wT_1 + (1-w)T_2 \tag{4}$$

wherein $T_{core}$ is as described above, w is a weighting factor, $T_1$ is the determined core temperature as a function of thermal energy transfer according to the second estimation while $T_2$ is the determined core temperature independent of the surface temperature according to the first estimation. The weighting factor, w, is a function of the ambient temperature variation rate and the air flow rate that is due to the degree of forced-air cooling discussed above. For example, when the ambient temperature variation rate is high, w should be higher, whereas when the ambient temperature is stable, w should be lower. In this particular aspect, w should range from about 0.001 to about 1.

The above description and drawings are only to be considered illustrative of exemplary embodiments, which achieve the features and advantages of the present invention. Modification and substitutions the features and steps described can be made without departing from the intent and scope of the present invention. Accordingly, the invention is not to be considered as being limited by the foregoing description and drawings, but is only limited by the scope of the appended claims.

What is claimed is:

1. A method for determining the core temperature of a battery comprising a plurality of cells, the method comprising:

performing a first estimation of said core temperature wherein said first estimation is independent of the surface temperature of said battery;

performing a second estimation of said core temperature as a function of thermal energy transfer through said battery;

applying a weighting factor to each of said first and second estimations; and calculating a core temperature as a function of said weighted first and second estimations wherein said calculating a core temperature as a function of said weighted first and second estimations is performed in accordance with the following relationship:

$$T_{core} = (1-w)T_1 + wT_2$$

wherein $T_{core}$ is said calculated core temperature, w is said weighting factor, $T_1$ is said first estimation and $T_2$ is said second estimation.

2. The method of claim 1, wherein said first estimation comprises:
measuring terminal current of at least one cell within said battery;
measuring terminal voltage of said at least one cell;
obtaining an ohmic resistance and a state of charge of said at least one cell based on said measured terminal current and said measured terminal voltage via recursive formula; and
determining said first estimation based on said ohmic resistance and said state of charge.

3. The method of claim 2, wherein said first estimation, said ohmic resistance and said state of charge are related to one another in lookup table.

4. The method of claim 3, further comprising updating said lookup table.

5. The method of claim 4, wherein said updating said lookup table comprises:
measuring the surface temperature of said battery upon termination of a stable rest period;
comparing said measured surface temperature to said calculated core temperature;
replacing said calculated core temperature with said measured surface temperature if said measured surface temperature differs from said calculated core temperature.

6. The method of claim 2, wherein said first estimation is repeated over a time interval.

7. The method of claim 1, wherein said second estimation comprises:
measuring terminal current of at least one cell within said battery;
obtaining an ohmic resistance of at least one cell within said battery with a recursive formula;
measuring a surface temperature of said battery; and
determining said second estimation based on said measured terminal current, said obtained ohmic resistance and said measured surface temperature.

8. The method of claim 7, wherein said second estimation is characterized by a relationship between said measured terminal current, said obtained ohmic resistance, at least one of a thermal conduction coefficient and a convection coefficient and at least two of a core temperature of said at least one cell, a surface temperature of said least one cell and an ambient temperature.

9. The method of claim 8, wherein said second estimation is further characterized by a thermal capacity constant that corresponds to a change in core temperature over time.

10. The method of claim 1, wherein said weighting factor is determined as a function of ambient temperature variation and air flow rate.

11. A method for dynamically estimating the core temperature of a battery, the method comprising:
performing a first estimation of said core temperature based on ohmic resistance and state of charge values in a lookup table;
performing a second estimation of said core temperature based on thermal energy transfer through said battery such that said second estimation forms a main predictor of said dynamic estimation and said first estimation forms a corrector of said second estimation;
applying a weighting factor to each of said first and second estimations; and
calculating said core temperature as a function of said weighted first and second estimations;

wherein said calculating said core temperature as a function of said weighted first and second estimations is performed in accordance with the following relationship:

$$T_{core} = (1-w)T_1 + wT_2$$

wherein $T_{core}$ is said calculated core temperature, w is said weighting factor, $T_1$ is said first estimation and $T_2$ is said second estimation.

12. The method of claim 11, further comprising measuring a surface temperature and an ambient temperature such that factors used to perform said second estimation are selected from the group consisting of a thermal resistance of said battery, a convection coefficient, said measured surface temperature and said ambient temperature.

13. The method of claim 12, wherein said convection coefficient corresponds to natural convection and is a function of temperature data available in a lookup table in a first convection condition, and wherein said convection coefficient corresponds to forced convention and is a function of forced convection airflow and temperature data available in a lookup table in a first convection condition.

14. The method of claim 11, further comprising measuring a surface temperature of said battery such that factors used to perform said second estimation are selected from the group consisting of current through said battery, said ohmic resistance, a thermal capacity of said battery, a thermal resistance of said battery and said measured surface temperature of said battery.

15. The method of claim 11, further comprising weighting said first and second estimations such that said dynamic estimation of said core temperature is determined in accordance with a linear relationship between weighted values of said first and second estimations.

16. A system for dynamically estimating the core temperature of a battery that provides at least a portion of propulsive means in a vehicle, said dynamic estimation a function of thermal energy transfer in said battery, said system comprising:
a plurality of sensors configured to transmit information related to at least one of surface temperature of said battery, ambient temperature, terminal voltage of said battery and terminal current of said battery;
a controller in signal communication with said plurality of sensors, wherein said controller comprises a processor and a memory device with signal communication between them and said plurality of sensors;
instructions cooperative with said controller for dynamically estimating said core temperature of said battery as a function of thermal energy transfer therethrough, said instructions comprising:
program code to measure a terminal current of at least one cell within said battery;
program code to obtain an ohmic resistance of at least one cell within said battery with a recursive formula;
program code to measure at least one of surface temperature of said battery and said ambient temperature; and
program code to determine said dynamic estimation based on said measured terminal current, said obtained ohmic resistance and at least one of said surface temperature and said ambient temperature; and
instructions cooperative with said controller and configured to correct said dynamic estimation through a temperature estimation that is independent of said surface temperature of said battery;

wherein said instructions further comprise program code to apply a weighting factor to said estimated core temperature as a function of thermal energy and said estimated core temperature that is independent of said surface temperature and calculating said core temperature as a function of said weighted estimated core temperature as a function of thermal energy and estimated core temperature that is independent of said surface temperature;

wherein said calculating said core temperature as a function of said weighted estimated core temperature that is independent of said surface temperature and said estimated core temperature as a function of thermal energy is performed in accordance with the following relationship:

$$T_{core} = (1-w)T_1 + wT_2$$

wherein $T_{core}$ is said calculated core temperature, w is said weighting factor, $T_1$ is said estimated core temperature that is independent of said surface temperature and $T_2$ is said estimated core temperature as a function of thermal energy.

17. The system of claim 16, wherein said instructions that are configured to correct said dynamic estimation through a temperature estimation that is independent of said surface temperature of said battery comprise:
   program code to measure said terminal current of said at least one cell;
   program code to measure said terminal voltage of said at least one cell;
   program code to determine said ohmic resistance and a state of charge of said at least one cell based on said measured terminal current and said measured terminal voltage via recursive formula; and
   program code to determine core temperature based on said determined ohmic resistance and said determined state of charge.

18. A vehicle incorporating the system of claim 16.

* * * * *